United States Patent
Hasegawa

(10) Patent No.: US 9,355,473 B2
(45) Date of Patent: May 31, 2016

(54) IMAGE FORMING APPARATUS HAVING COLOR CONVERSION CAPABILITY

(71) Applicant: Brother Kogyo Kabushiki Kaisha, Nagoya-shi, Aichi-ken (JP)

(72) Inventor: Tomohiko Hasegawa, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/466,312

(22) Filed: Aug. 22, 2014

(65) Prior Publication Data

US 2015/0055864 A1 Feb. 26, 2015

(30) Foreign Application Priority Data

Aug. 23, 2013 (JP) .................................. 2013-173650

(51) Int. Cl.
- *G06K 9/00* (2006.01)
- *G06T 11/00* (2006.01)

(52) U.S. Cl.
CPC .................................. G06T 11/001 (2013.01)

(58) Field of Classification Search
CPC .................................................. G06T 11/001
USPC ....................................................... 382/167
See application file for complete search history.

(56) References Cited

U.S. PATENT DOCUMENTS

| | | | |
|---|---|---|---|
| 8,824,806 B1* | 9/2014 | Gayles et al. | 382/199 |
| 2002/0131646 A1* | 9/2002 | Fujimoto et al. | 382/266 |
| 2002/0150935 A1* | 10/2002 | Zhou et al. | 435/6 |
| 2006/0077406 A1* | 4/2006 | Bhattacharjya | 358/1.9 |
| 2008/0089568 A1* | 4/2008 | Delenstarr | 382/128 |
| 2009/0015553 A1* | 1/2009 | Hirahara et al. | 345/158 |
| 2009/0310863 A1* | 12/2009 | Gallagher et al. | 382/182 |
| 2010/0027887 A1* | 2/2010 | Kawashima | 382/171 |
| 2011/0001823 A1* | 1/2011 | Dufour et al. | 348/143 |
| 2013/0322747 A1* | 12/2013 | Ozawa | 382/164 |

FOREIGN PATENT DOCUMENTS

| | | | |
|---|---|---|---|
| EP | 0113016 B1 * | 9/1990 | |
| JP | H01-196975 A | 8/1989 | |
| JP | H03-44268 A | 2/1991 | |
| JP | 2007-251524 A | 9/2007 | |

* cited by examiner

*Primary Examiner* — Yubin Hung
(74) *Attorney, Agent, or Firm* — Banner & Witcoff, Ltd.

(57) ABSTRACT

An image processing apparatus includes a processor and a memory storing instructions which, when executed by the processor, cause the image processing apparatus to perform: receiving target image data representing a target image; determining, from a plurality of pixels in the target image, a plurality of first-type pixels having a color value within a specific range having a color value indicating a color of a conversion target; calculating, for each of the plurality of first-type pixels, non-uniformity of color values of a plurality of pixels in a specific surrounding area including the first-type pixels; determining, from the plurality of first-type pixels, a second-type pixel which non-uniformity is a reference value or less, and converting a color value of the second-type pixel into a specific color value.

18 Claims, 9 Drawing Sheets

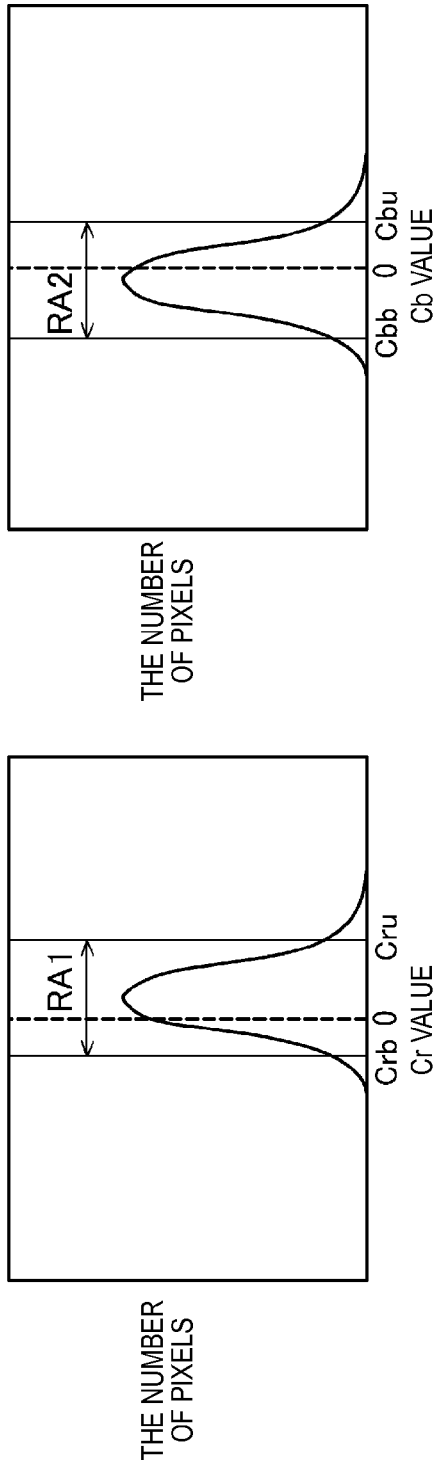
FIG. 8A
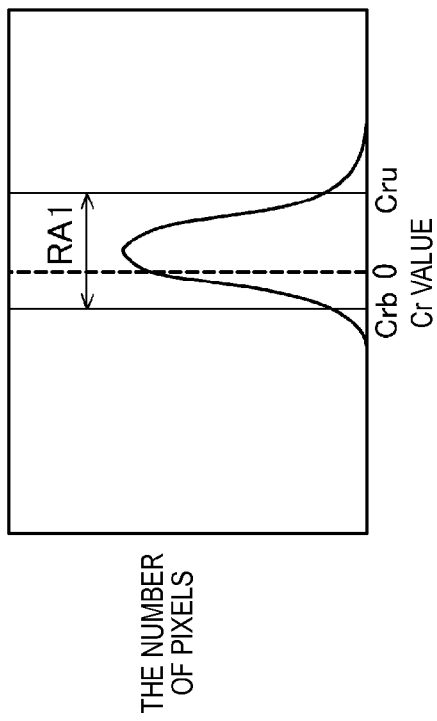
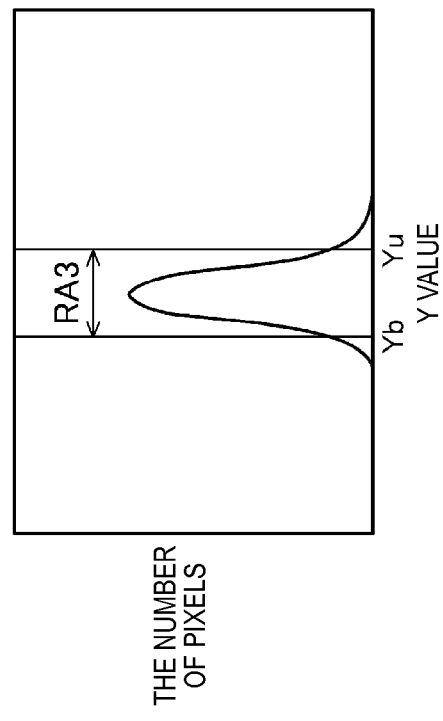
FIG. 8B
FIG. 8C

IMAGE FORMING APPARATUS HAVING COLOR CONVERSION CAPABILITY

CROSS-REFERENCE TO RELATED APPLICATIONS

This application claims priority from Japanese Patent Application No. 2013-173650 filed on Aug. 23, 2013, the entire subject-matter of which is incorporated herein by reference.

TECHNICAL FIELD

The disclosure relates to an image processing technology, and more specifically, to an image processing technology of converting a color of a specific pixel in a target image.

BACKGROUND

There has been known a technology of converting a color of a specific pixel in a target image represented by image data. For example, according to a related art, a color of a pixel, which represents a color within a specific range close to white, of a plurality of pixels in a target image is converted into white. Thereby, a background color in the target image can be removed.

SUMMARY

Illustrative aspects of the disclosure provide a technology of appropriately determining a pixel of which color should be converted and suppressing a color of a pixel that should not be converted from being converted.

According to one illustrative aspect of the disclosure, there is provided an image processing apparatus comprising: a processor; and a memory storing instructions, the instructions, when executed by the processor, causing the image processing apparatus to perform: receiving target image data representing a target image, which is a processing target of image processing; determining, from a plurality of pixels in the target image, a plurality of first-type pixels having a color value within a specific range, the specific range having a color value that indicates a color of a conversion target; calculating, for each of the plurality of first-type pixels, non-uniformity of color values of a plurality of pixels in a specific surrounding area that includes the first-type pixels; determining, from the plurality of first-type pixels, a second-type pixel of which the non-uniformity is a reference value or less, and converting a color value of the second-type pixel into a specific color value.

According to another illustrative aspect of the disclosure, there is provided a sheet comprising: an object area representing an object having a specific color, and a reference area, which is arranged at a predetermined position on the sheet, and which has the same or similar color as or to the specific color of the object area, wherein the reference area is used to convert colors of a plurality of pixels representing the object area in an image, which is represented by image data generated by optically reading the sheet, by interpreting the image data.

BRIEF DESCRIPTION OF THE DRAWINGS

FIGS. 8A to 8C illustrate an example a generated histogram;

DETAILED DESCRIPTION

General Overview

Figure 1:
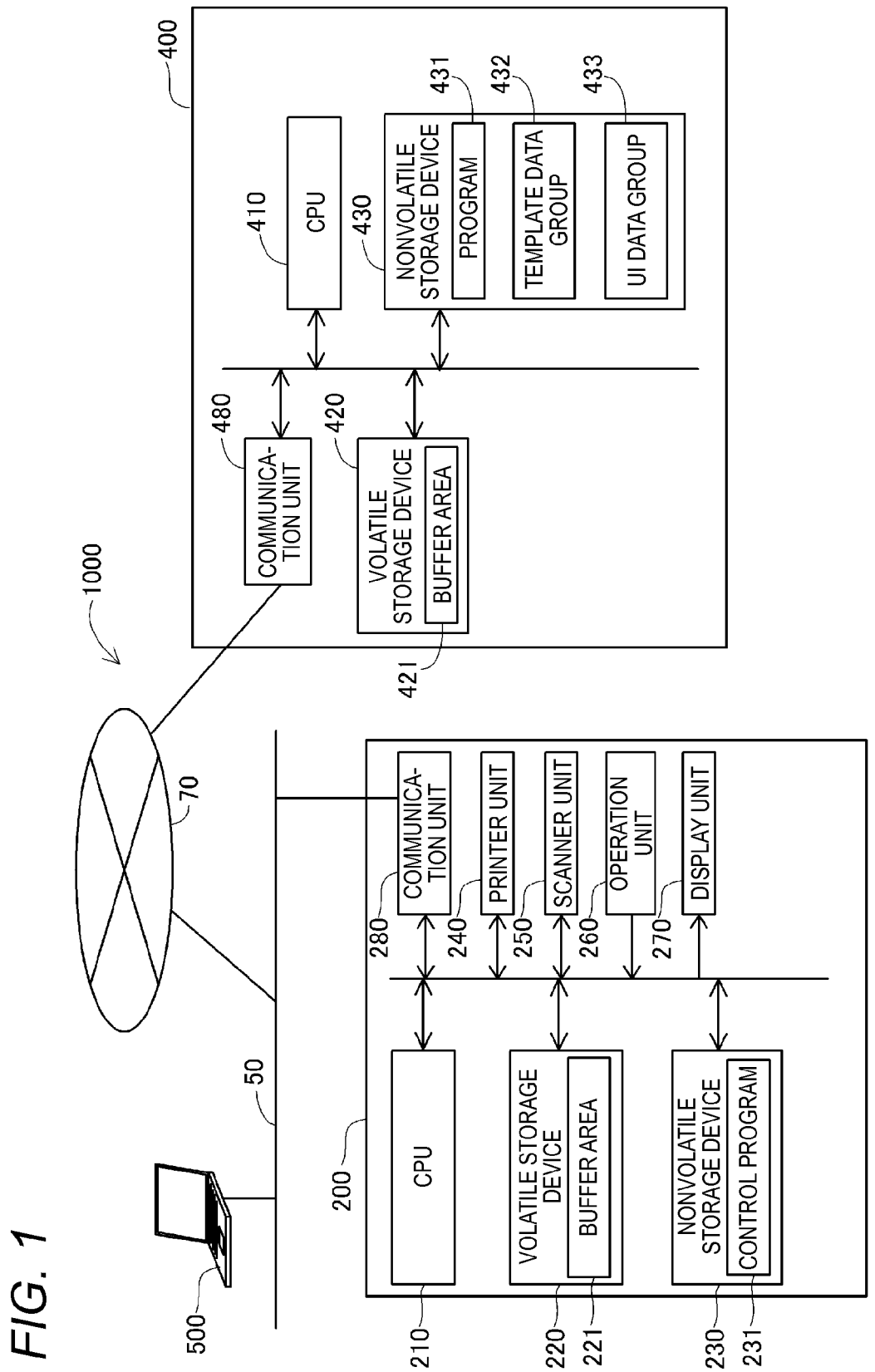
FIG. 1 is a block diagram showing a configuration of an image processing system according to one illustrative embodiment.

The above-described related-art has some disadvantages. For example, when the color of the pixel representing the color within the specific range is set as a conversion target, a color of a pixel that should not be originally converted may be converted. As a result, an unintended part may be removed from an image that is represented by the image data after the conversion.

Therefore, illustrative aspects of the disclosure provide a technology of appropriately determining a pixel of which color should be converted and suppressing a color of a pixel that should not be converted from being converted.

According to an illustrative aspect (1) of the disclosure, there may be provided an image processing apparatus comprising: a processor; and a memory storing instructions, the instructions, when executed by the processor, causing the image processing apparatus to perform: receiving target image data representing a target image, which is a processing target of image processing; determining, from a plurality of pixels in the target image, a plurality of first-type pixels having a color value within a specific range, the specific range having a color value that indicates a color of a conversion target; calculating, for each of the plurality of first-type pixels, non-uniformity of color values of a plurality of pixels in a specific surrounding area that includes the first-type pixels; determining, from the plurality of first-type pixels, a second-type pixel of which the non-uniformity is a reference value or less, and converting a color value of the second-type pixel into a specific color value.

According to the above configuration, the pixel of which a color value is within the specific range and the non-uniformity of the color value in the surrounding area is the reference value or less is determined as a conversion target pixel. As a result, it is possible to appropriately determine a pixel of which color should be converted. Therefore, it is possible to suppress a color of a pixel that should not be converted from being converted.

In another illustrative aspect (2) of the image processing apparatus of (1), the calculating the non-uniformity may comprise calculating non-uniformity of color values of the plurality of first-type pixels in the specific surrounding area.

According to the above configuration, the second-type pixel is determined using the non-uniformity of the color values of the plurality of first-type pixels having color values within the specific range. As a result, it is possible to determine a pixel of which color should be converted, more appropriately.

In still another illustrative aspect (3) of the image processing apparatus of (1) or (2), the target image may comprise a reference area, which is arranged at a predetermined position in the target image, and which has the same or similar color as or to a specific area in the target image, the instructions, when executed by the processor, may cause the image processing apparatus to further perform interpreting the reference area, and at least one of the first-type pixel and the second-type pixel may be determined using an interpretation result of the reference area.

According to the above configuration, since a pixel of which color should be converted is determined using the reference area, it is possible to appropriately convert a color of the specific range in the target image.

In still another illustrative aspect (4) of the image processing apparatus of (3), the interpreting the reference area may comprise determining, based on color values of a plurality of pixels in the reference area, the specific range for determining the first-type pixel.

According to the above configuration, since it is possible to determine the appropriate specific range, it is possible to determine a pixel of which color should be converted, more appropriately.

In still another illustrative aspect (5) of the image processing apparatus of (3) or (4), the interpreting the reference area may comprise determining, based on color values of a plurality of pixels in the reference area, the reference value for determining the second-type pixel.

According to the above configuration, since it is possible to determine an appropriate reference value, it is possible to determine a pixel of which color should be converted, more appropriately.

In still another illustrative aspect (6) of the image processing apparatus of any one of (3) to (5), the target image data may be image data that is obtained by optically reading a document comprising an image representing the reference area and the specific area.

According to the above configuration, it is possible to appropriately convert the color of the specific range in the target image represented by the target image data that is obtained by reading a document.

In still another illustrative aspect (7) of the image processing apparatus of any one of (3) to (6), the specific area in the target image may be a specific object area representing an object different from a background of the target image.

According to the above configuration, it is possible to appropriately convert a color of the specific object area in the target image.

In still another illustrative aspect (8) of the image processing apparatus of any one of (1) to (8), the instructions, when executed by the processor, may cause the image processing apparatus to further perform outputting first image data representing the converted target image and second image data representing an image comprising the converted target image and a blank, and a size of the converted target image printed on a first-type sheet by using the first image data may be the same as a size of the converted target image printed on a second-type sheet, which is larger than the first-type sheet, by using the second image data.

According to the above configuration, a user prints an image on the second-type sheet by using the second image data, so that the user can appropriately check a content of the converted target image without printing the image on the first-type sheet.

In still another illustrative aspect (9), there may be provided a sheet comprising: an object area representing an object having a specific color, and a reference area, which is arranged at a predetermined position on the sheet, and which has the same or similar color as or to the specific color of the object area, wherein the reference area is used to convert colors of a plurality of pixels representing the object area in an image, which is represented by image data generated by optically reading the sheet, by interpreting the image data.

According to the above configuration, an apparatus having received the image data, which is generated by optically reading the sheet, can appropriately convert a color of the plurality of pixels representing the object area in the image.

Incidentally, the disclosure can be implemented in a variety of aspects. For example, the disclosure can be implemented in forms of an image processing method, a computer program for implementing functions or methods of an image processing apparatus, a non-transitory computer-readable recording medium having the computer program stored thereon, and the like.

Illustrative Embodiments

Configuration of Image Processing System 1000

FIG. 1 is a block diagram showing a configuration of an image processing system according to a first illustrative embodiment. The image processing system 1000 has a server 400 serving as an image processing apparatus and a multi-function device 200. The server 400 is connected to an Internet 70 and the multi-function device 200 is connected to the Internet 70 through a LAN (which is an abbreviation of Local Area Network) 50. As a result, the server 400 and the multi-function device 200 can perform communication with each other through the LAN 50 and the Internet 70. Further, a PC 500 of a user of the multi-function device 200 may be connected to the LAN 50.

The server 400 has a CPU 410, a volatile storage device 420 such as a DRAM, a non-volatile storage device 430 such as a hard disk drive and a flash memory, and a communication unit 480 including an interface for connection to a network such as the Internet 70. The volatile storage device 420 is provided with a buffer area 421 that temporarily stores therein a variety of intermediate data generated when the CPU 410 executes processing. The non-volatile storage device 430 stores therein a computer program 431, a template data group 432 including a plurality of template image data and a UI data group 433, which will be described later.

The computer program 431 is provided with being stored in a DVD-ROM and the like, for example, and is installed in the server 400 by an administrator of the server 400. The CPU 410 executes the computer program 431, thereby implementing image processing that will be described later.

Figure 2A:
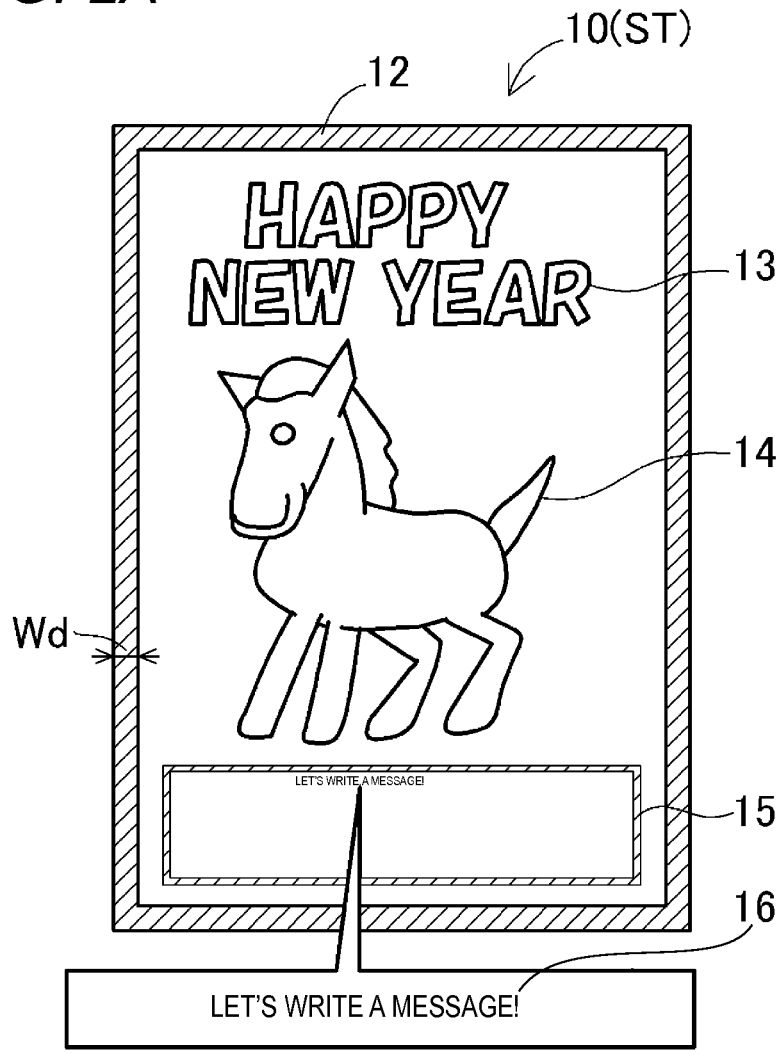
FIGS. 2A and 2B illustrate an example of template data.
Figure 2B:
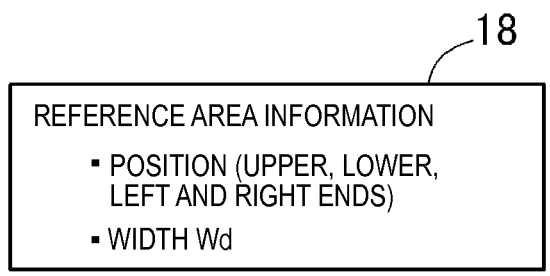

FIG. 2 illustrates an example of template data. One template data includes template image data representing a template image 10 (FIG. 2A) and reference area information 18 (FIG. 2B).

The template image data is RGB image data, for example. In the example of FIG. 2A, the template image 10 is printed on an A4 sheet, for example, and is used so as for a user to prepare a document of an image to be printed on a postcard. The user prepares the document by coloring the template image 10 printed on the sheet with a colored pencil or felt-tip pen or writing a letter thereon.

The template image 10 includes a main object such as a background picture 13 having a letter shape and a background picture 14 having a predetermined character shape and a sub-object such as a guide line 15 indicating an area in which the user writes a letter and a message 16 prompting the user to write a letter. The sub-object is an object that is to be removed by unnecessary part removing processing (which will be described later), and the main object is an object that is not to be removed by the unnecessary part removing processing (which will be described later). The sub-object is a single-color object having a specific color, in this illustrative embodiment, an achromatic color having relatively high brightness. For example, when the brightness is represented with 256 gradations of 0 to 255, the specific color is an achromatic color having brightness within a range of $100 \leq Y \leq 200$. The main object has a color different from the specific color of the sub-object, for example, an achromatic color having relatively low brightness, for example, an achromatic color having brightness within a range of $0 \leq Y \leq 50$.

A reference area 12 is arranged over an entire circumference of an outer edge part of the template image 10. The reference area 12 is a band-shaped area having a width Wd, for example. The reference area 12 is a single-color area having the above-described specific color of the sub-object.

The reference area information 18 is information indicating a position of the reference area 12 in the template image 10. The reference area information 18 includes information indicating end portions (upper, lower, left and right ends) of the template image 10 at which the reference area 12 is provided and the width Wd of the reference area 12.

The multi-function device 200 has a CPU 210, a volatile storage device 220 such as a DRAM, a non-volatile storage device 230 such as a flash memory and a hard disk drive, a printer unit 240, a scanner unit 250, an operation unit 260 such as a touch panel and a button, a display unit 270 such as a liquid crystal monitor and a communication unit 280 for performing communication with an external device. For example, the communication unit 280 includes an interface for connection to the network such as the LAN 50 and an interface for connection to an external storage device (for example, a USB memory).

The volatile storage device 220 is provided with a buffer area 221 that temporarily stores therein various data generated when the CPU 210 executes processing. The non-volatile storage device 230 stores therein a control program 231.

The printer unit 240 executes a printing by using a printing method such as an inkjet method and a laser method. The scanner unit 250 optically reads a document by using a photoelectric conversion element (for example, CCD, CMOS), thereby generating scan data.

The CPU 210 executes the control program 231, thereby controlling the multi-function device 200. For example, the CPU 210 controls the printer unit 240 and the scanner unit 250, thereby executing copy, printing, scan processing and the like. Further, the CPU 210 accesses the server 400 to execute service using processing of using a service that is provided by the server 400.

(Operations of Image Processing System 1000)

The CPU 410 of the server 400 executes image processing (which will be described later) for scan data, which is obtained by optically reading the template image in response to a request of the multi-function device 200 serving as a client, thereby generating processed image data. In this illustrative embodiment, the image processing is executed so as to implement an image generating service that is provided to the client by the server 400. Hereinafter, operations of the image processing system 1000 including the image generating service provided by the server 400 are described.

Figure 3:
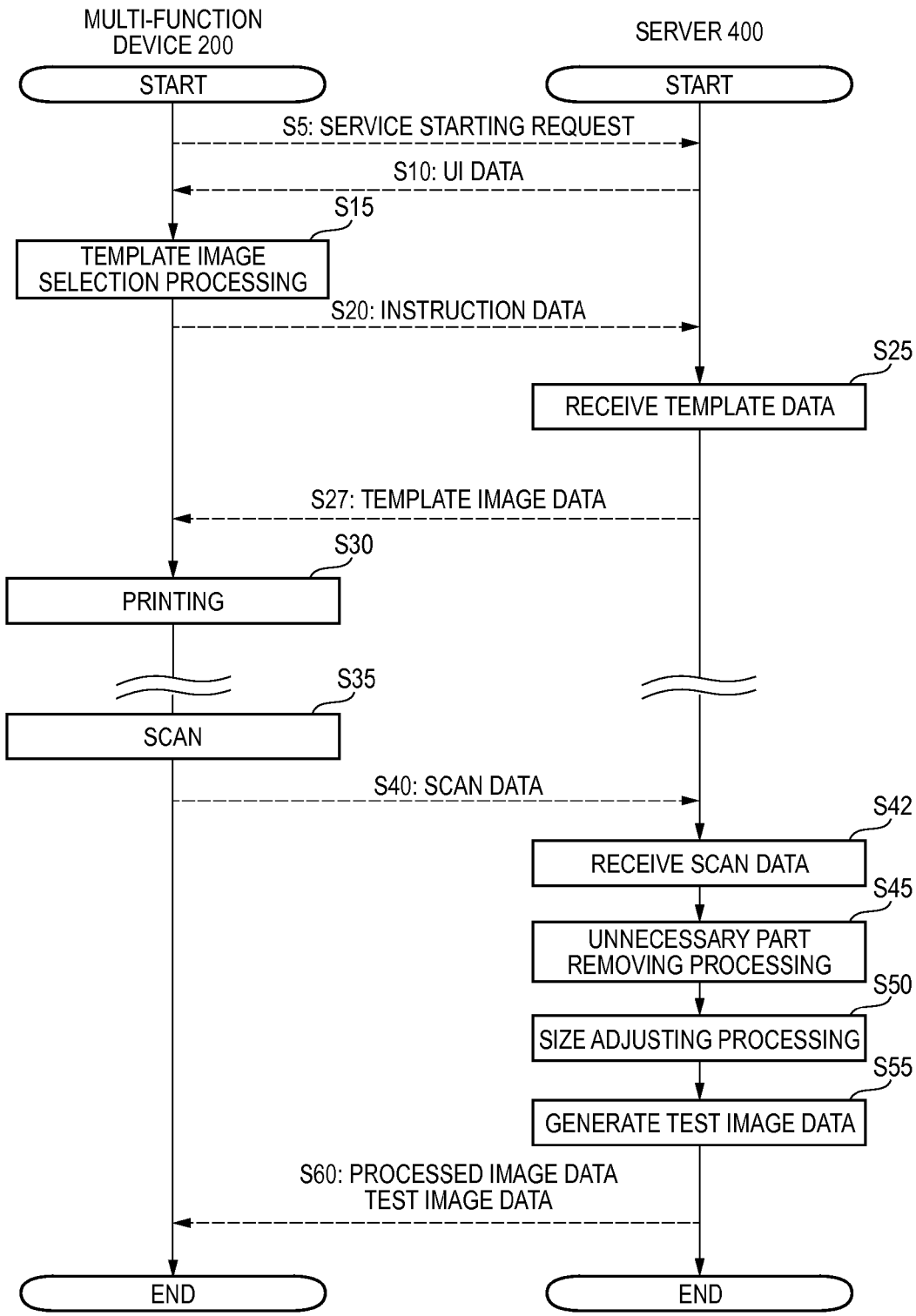
FIG. 3 is a flowchart showing operations of an image processing system 1000.

FIG. 3 is a flowchart showing operations of the image processing system 1000. The processing of the flowchart starts when the multi-function device 200 receives a using instruction of the image generating service provided by the server 400 from the user. Specifically, the image generating service is a service of generating an image to be printed on a postcard (for example, a New Year's card) by using the scan data generated through the scanner unit 250. The scan data is RDB image data, for example.

When the processing starts, the CPU 210 of the multi-function device 200 transmits a service starting request to the server 400 in step S5. When the service starting request is received, the CPU 410 of the server 400 selects UI data necessary to provide the image generating service from the UI data group 433 (FIG. 1) and transmits the UI data to the multi-function device 200 (step S10). Specifically, the UI data includes a variety of image data necessary to display a UI image and control data. The control data includes a variety of data that is necessary for the multi-function device 200 to execute predetermined processing (specifically, processing of S15, S20, S30, S35 and S40, which will be described later) by using the UI image, for example. For example, the control data includes information indicating processing that should be executed by the multi-function device 200 on the basis of a user's instruction received through the UI image (for example, FIG. 4), for example, processing of transmitting selection instruction data to the server 400.

In step S15, the CPU 210 executes template image selection processing, based on the received UI data. The template image selection processing is processing of receiving an instruction to select a template image (which will be described later) from the user.

Figure 4:
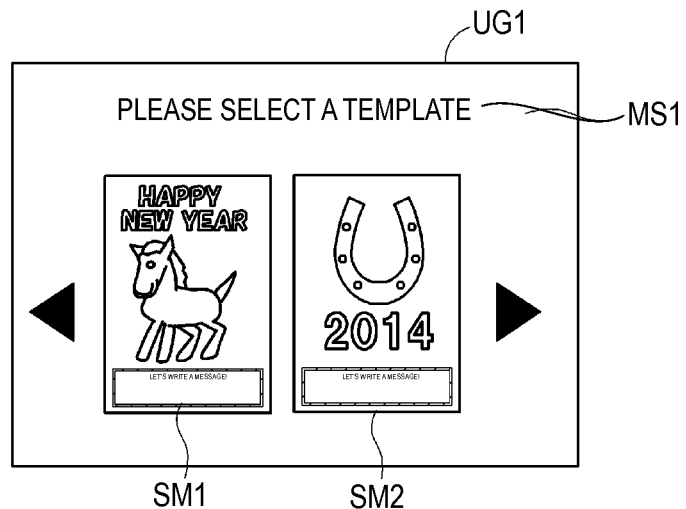
FIG. 4 illustrates an example of a UI image.

FIG. 4 illustrates an example of the UI image. First, the CPU 210 displays a UI image UG1 on the display unit 270 and receives a selection of a template image to be used from the user. For example, the UI image UG1 includes a plurality of thumbnail images SM1, SM2 indicating a plurality of selectable template images and a message MS1 prompting the user to select a template image. The image data group indicating the UI image UG1 and the thumbnail images SM1, SM2 is included in the UI data received from the server 400.

In step S20, the CPU 210 transmits selection instruction data, which includes information designating the template image selected by the user, to the server 400.

In step S25, the CPU 410 of the server 400 receives template data (FIG. 2) corresponding to the template image selected by the user from the template data group 432 (FIG. 1) stored in the non-volatile storage device 430, based on the received selection instruction data. The template data may be obtained from an external device, for example, another server or external storage device connected to the server 400. Incidentally, subsequent processing is described with reference to an example where the template image 10 shown in FIG. 2 is selected by the user.

In step S27, the CPU 410 transmits the template image data of the received template data to the multi-function device 200. The reference area information 18 of the received template data is stored in the buffer area 421 without being transmitted to the multi-function device 200.

In step S30, the CPU 210 of the multi-function device 200 controls the printer unit 240 by using the received template image data, thereby printing the template image 10 (FIG. 2A) on a sheet. It can be said that FIG. 2A illustrates a sheet ST having the template image 10 printed thereon. That is, the sheet ST has the sub-objects 15, 16 having the specific color (gray, in this illustrative embodiment), the reference area 12 arranged at the outer edge part of the sheet ST and having the same color as the specific color of the sub-object areas and the main objects 13, 14 having a color different from the specific color. The reference area 12 is used in the unnecessary part removing processing (step S45, which will be described later), which is executed using scan data generated by reading the sheet ST (step S35, which will be described later). That is, as described later, the reference area 12 is used to interpret the scan data, thereby removing the sub-objects 15, 16 in the scan image. In this illustrative embodiment, it is possible to appropriately remove the guide line 15 and the message 16 in the scan image 10P by using the sheet ST in the unnecessary part removing processing.

The user colors or writes a letter on the sheet ST having the template image 10 printed thereon, thereby preparing a document. In step S35, the CPU 210 of the multi-function device 200 optically reads the document prepared by the user with the scanner unit 250, thereby generating the scan data.

Figure 5:
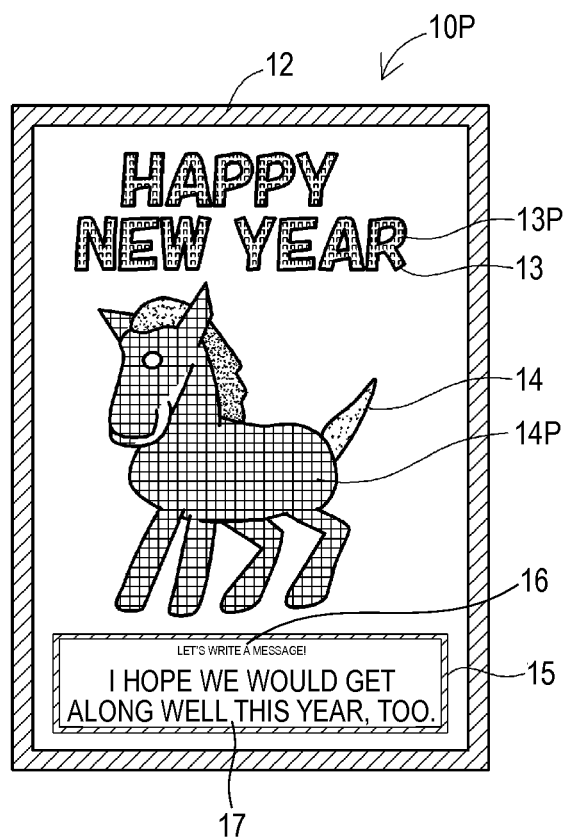
FIG. 5 illustrates an example of a scan image 10P represented by scan data.

FIG. 5 illustrates an example of the scan image 10P represented by the scan data. It can be said that the scan image 10P is the template image 10 for which the user has made a coloring or has written a letter. As shown in FIG. 5, the scan image 10P includes the background pictures 13, 14, which are the main objects of the template image 10, the guide line 15 and the message 16, which are the sub-objects, and the reference area 12. The scan image 10P further includes colored parts 13P, 14P colored by the user and letters 17 written by the user. The colored parts 13P, 14P and the letters 17 are referred to as user objects.

When the scan data is generated, the CPU 210 transmits the generated scan data to the server 400 in step S40. As a result, the CPU 410 of the server 400 obtains the scan data (step S42).

In step S45, the CPU 410 executes the unnecessary part removing processing. The unnecessary part removing processing is processing of removing the sub-objects 15, 16 from the scan image 10P that is a processing target. In this illustrative embodiment, an image to be printed on a postcard is generated by the unnecessary part removing processing. The image to be printed on a postcard necessarily includes the main objects 13, 14 and the user objects 13P, 14P, 17. Therefore, it is required not to remove the main objects and the user objects in the unnecessary part removing processing of this illustrative embodiment.

Figure 6:
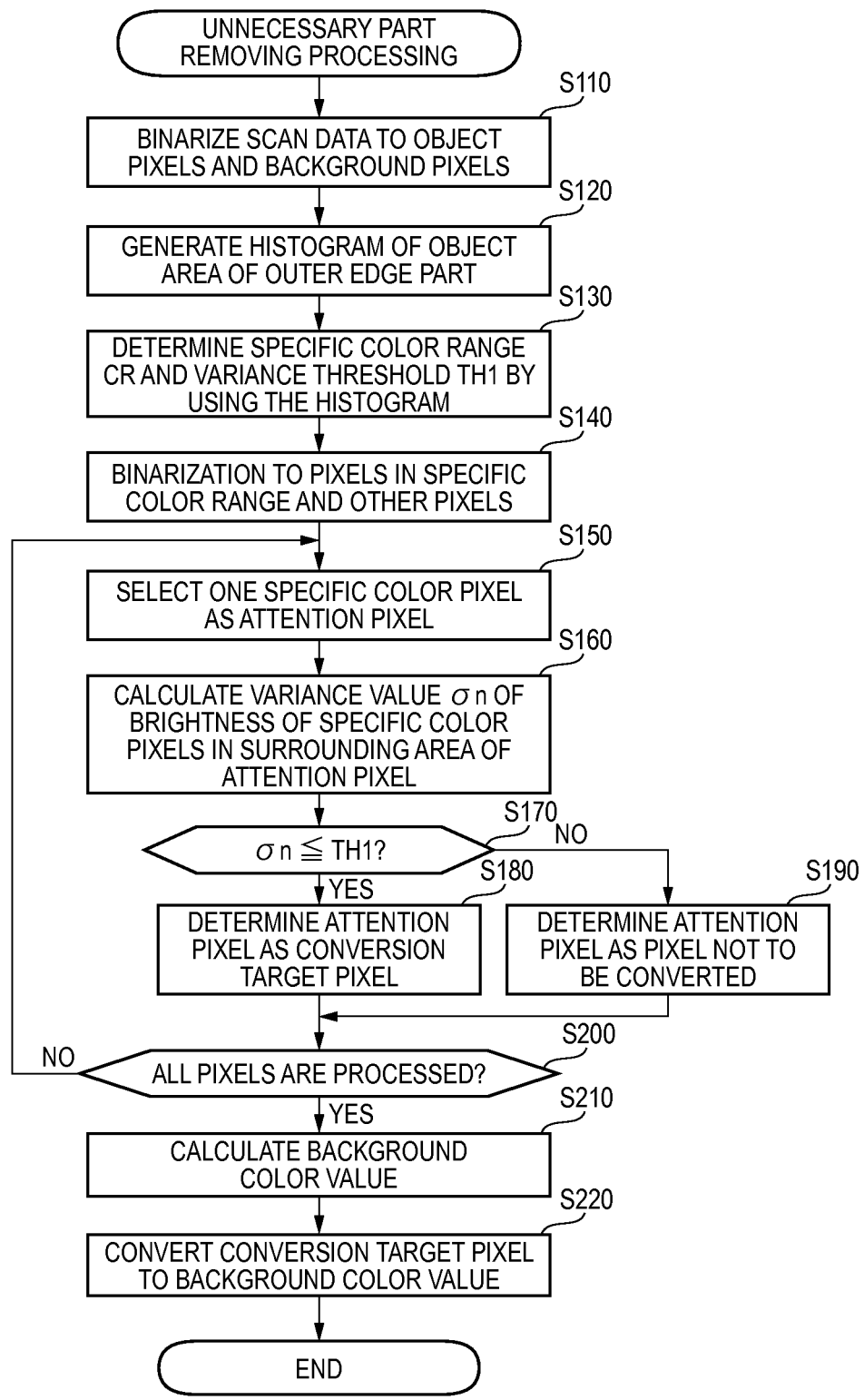
FIG. 6 is a flowchart of unnecessary part removing processing.

FIG. 6 is a flowchart of the unnecessary part removing processing. In step S110, the CPU 410 specifies object pixels and background pixels in the scan image 10P (FIG. 5). Specifically, the CPU 410 binarizes the scan data to classify the plurality of pixels in the scan image 10P into background pixels, which have a background color (for example, white), and object pixels, which have a color that is different from the background color.

Figure 7:
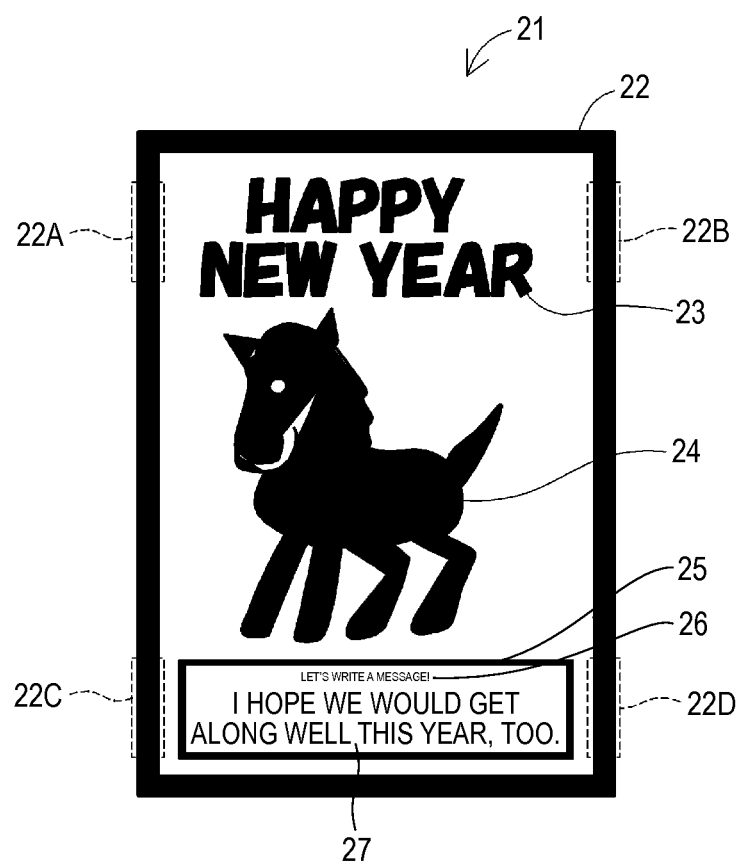
FIG. 7 illustrates an example of a binary image 21 binarized to object pixels and background pixels.

FIG. 7 illustrates an example of a binary image 21 binarized to the object pixels and the background pixels. In the binary image 21, a black area indicates an area configured by the object pixels and a white area indicates an area configured by the background pixels.

As shown in FIG. 7, the binary image 21 includes a plurality of object areas 23 to 27 corresponding to the main objects 13, 14, the sub-objects 15, 16 and the user objects 13P, 14P, 17 of the scan image 10P. The binary image 21 further includes an object area 22 at the outer edge part corresponding to the reference area 12 of the scan image 10P. By referring to the binary image 21, it is possible to specify the object pixels in the scan image 10P.

In step S120, the CPU 410 generates a histogram of the object pixels of the outer edge part in the scan image 10P. Specifically, the CPU 410 converts a color system of the scan image 10P from the RGB color system to a YCrCb color system. The CPU 410 refers to the reference area information 18 (FIG. 2B), thereby specifying an area in the scan image 10P, in which the reference area 12 exists. Further, the CPU 410 generates a histogram of the plurality of object pixels, which are specified by the binary image 21, of the plurality of pixels in the area in the scan image 10P, in which the reference area 12 exists. That is, the CPU 410 generates a histogram of the plurality of pixels in the scan image 10P corresponding to the object area 22 in the binary image 21 shown in FIG. 7. Incidentally, when generating the histogram, it is not necessarily required to use all the pixels in the scan image 10P corresponding to the object area 22. In this illustrative embodiment, a histogram of the plurality of pixels in the scan image 10P, which correspond to four areas 22A to 22D (FIG. 7) positioned in the vicinity of four corners of the binary image 21, is generated.

Here, a histogram of the plurality of pixels in the reference area 12 defined by the reference area information 18 is not generated but a histogram of the plurality of object pixels, which exist in the reference area 12 defined by the reference area information 18 and are specified by the binary image 21, is generated. The reason is as follows. When scanning a document representing the scan image 10P, if a position of the document with respect to a scanner platen of the scanner unit 250 deviates, a position at which the reference area 12 is arranged in the scan image 10P may deviate. For this reason, the plurality of pixels in the reference area 12 defined by the reference area information 18 may include pixels different from the pixels configuring the reference area 12, for example, may include the pixels configuring the background. Therefore, in this illustrative embodiment, in order to generate a histogram of only the pixels configuring the reference area 12, a histogram of the plurality of object pixels, which exist in the reference area 12 defined by the reference area information 18 and are specified by the binary image 21, is generated.

FIG. 8 illustrates an example of the generated histogram. FIGS. 8A to 8C illustrate histograms of Cr, Cb and Y values of the YCrCb color system, respectively. The histogram is generated by classifying the respective pixels into a plurality of classes in accordance with values of the pixels. The reference area 12 has a single color on the template image 10 (FIG. 2A) represented by the template image data. However, a change or non-uniformity of the color may be caused in the reference area 12 on the template image 10 printed on the document, due to non-uniformity of the printing and the like. Furthermore, on the scan image 10P (FIG. 5) represented by the scan data, which is obtained by reading the template image 10 printed on the document, the change or non-uniformity of the color may be further caused in the reference area 12 due to non-uniformity of the reading by the scanner unit 250 and the like. For this reason, it can be seen in the histograms of FIG. 8A to 8C that the color values (Cr, Cb and Y values) of the pixels configuring the reference area 12 are distributed in a mountain shape.

In step S130, the CPU 410 determines a specific color range CR and a variance threshold TH1 by using the histogram. The specific color range CR is a range including a color value indicating the color to be removed, i.e., the specific color of the sub-objects 15, 16. The variance threshold TH1 is a threshold that is compared to a variance value σn to be calculated in processing that will be described later.

As the specific color range CR, respective ranges of the Cr value, the Cb value and the Y value are determined. Specifically, a range in which a predetermined ratio of pixels (for example, pixels of 90%) of the plurality of pixels used for generation of the histogram is included is determined as the specific color range CR. For example, the respective ranges of the Cr value, the Cb value and the Y value are determined as ranges of RA1, RA2, RA3 shown in FIG. 8, i.e., ranges of Crb≤Cr≤Cru, Cbb≤Cb≤Cbu and Yb≤y≤Yu.

The variance threshold TH1 is determined with respect to the Y value (brightness). Specifically, a variance value ref of the Y values of the plurality of pixels used for generation of the histogram is calculated. The variance threshold TH1 is determined as a value obtained by adding a predetermined value Au to the variance value σref (TH1=σref+Δσ (Δσ>0)).

In step S140, the CPU 410 binarizes the scan data by using the specific color range CR, thereby classifying the plurality of pixels in the scan image 10P (FIG. 5) into specific color pixels and pixels (also referred to as non-specific color pixels) different from the specific color pixels. Specifically, the specific color pixel is a pixel having a color value within the specific color range CR, i.e., a pixel having a color value satisfying the conditions of Crb≤Cr≤Cru, Cbb≤Cb≤Cbu and Yb≤Y≤Yu.

Figure 9:
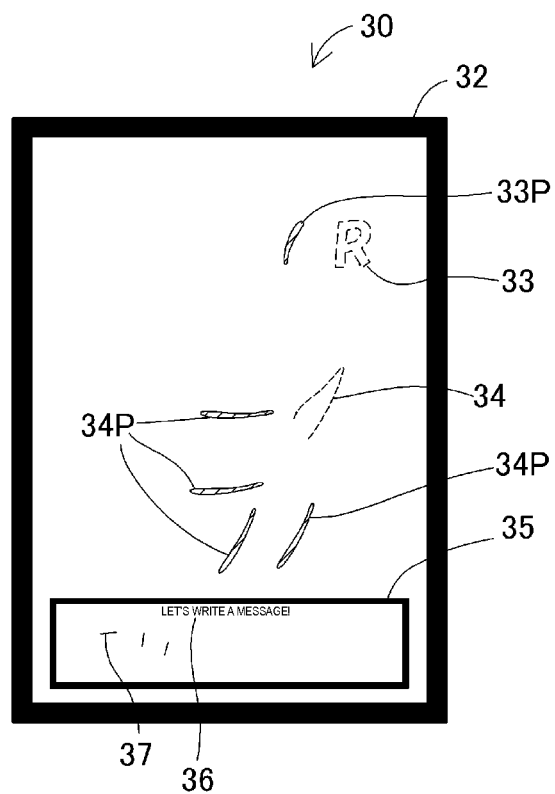
FIG. 9 illustrates an example of a binary image 30 binarized to specific color pixels and non-specific color pixels.

FIG. 9 illustrates an example of a binary image 30 binarized to the specific color pixels and the non-specific color pixels. In the binary image 30, a black area indicates an area configured by the specific color pixels and a white area indicates an area configured by the non-specific color pixels. In this way, the specific color pixels in the scan image 10P are specified by the binary image 30. A pixel group classified as the specific color pixels includes pixel groups 35, 36 configuring the sub-objects 15, 16 that should be removed. Further, the pixel group classified as the specific color pixels may include pixel groups 33, 33P, 34, 34P, 37 configuring the objects that should not be removed.

For example, the pixel groups 33, 34 of FIG. 9 are parts (for example, edge parts) of the main objects 13, 14. On the template image 10 (FIG. 2A) represented by the template image data, the main objects 13, 14 have colors different from the specific color of the sub-objects 15, 16. However, on the scan image 10P (FIG. 5) represented by the scan data, the main object may have a color close to the specific color of the sub-objects 15, 16 due to a burning and the like occurring upon the reading.

Further, the pixel groups 33P, 34P, 37 are parts of the user objects 13P, 14P, 17. Since the user object is an object colored or written by the user, it may include various colors. For this reason, the user objects 13P, 14P, 17 may have a color close to the specific color.

In step S150, the CPU 410 selects one attention pixel from the plurality of specific color pixels specified by the binary image 30.

Figure 10:
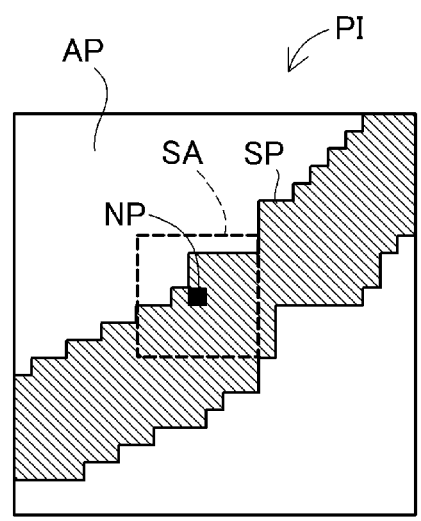
FIG. 10 is an enlarged view of a partial image PI that is a part of the scan image 10P.

In step S160, the CPU 410 calculates a variance value σn of the brightness (i.e., Y values) of the plurality of specific color pixels included in a surrounding area SA including the attention pixel. FIG. 10 is an enlarged view of a partial image PI that is a part of the scan image 10P.

A center pixel NP of the partial image PI shown in FIG. 10 is the attention pixel. Further, a hatched area is an area configured by the plurality of specific color pixels SP, and a non-hatched area is an area configured by the plurality of non-specific color pixels AP. The surrounding area SA of the attention pixel NP is a rectangle area of height 7 pixels×width 7 pixels in which the attention pixel NP is located at the center. In the example of FIG. 10 corresponding to the partial image PI of the binary image 30, the variance value σn of the Y values of the plurality of hatched pixels of the 49 pixels in the surrounding area SA is calculated.

In step S170, the CPU 410 determines whether the calculated variance value σn is the variance threshold TH1 or less determined in step S130.

When the variance value σn is the variance threshold TH1 or less (step S170: YES), the CPU 410 determines the attention pixel as a conversion target pixel (step S180). When the variance value σn is more than the variance threshold TH1 (step S170: NO), the CPU 410 determines the attention pixel as a pixel not to be converted (step S190).

In step S200, the CPU 410 determines whether all the specific color pixels are processed as the attention pixel. When the specific color pixel that is not processed yet remains (step S200: NO), the CPU 410 returns to step S150 and selects the non-processed specific color pixel as the attention pixel.

When all the specific color pixels are processed as the attention pixel, all the specific color pixels in the scan image 10P are classified as one of a conversion target pixel and a pixel not to be converted. For example, the pixel groups 33, 33P, 34, 34P, 37 configuring the objects 13, 13P, 14, 14P, 17, which should not be removed, of the specific color pixel groups specified by the binary image 30 of FIG. 9 are classified as the pixels not to be converted. The pixel groups 35, 36, 32 configuring the sub-objects 15, 16 and the reference area 12, which should be removed, of the specific color pixel groups shown in FIG. 9 are classified as the conversion target pixels.

The sub-objects 15, 16 that should be removed have a single color on the template image 10 represented by the template image data. Therefore, the non-uniformity of the brightness of the pixels configuring the sub-objects 15, 16 is relatively small on the scan image 10P. In contrast, the pixels, which are classified as the specific color pixels, of the pixels configuring the objects 13, 13P, 14, 14P, 17 that should not be removed are the edge part of the main object or a part of the user object. Therefore, it is thought that the non-uniformity of the brightness is relatively large. For example, since the edge part of the main object is a part in which the color changes stepwise, it is thought that the non-uniformity of the brightness is relatively large. Further, since the user object is an object representing the coloring or writing made with a pencil or felt-tip pen, it is thought that the non-uniformity of the brightness is relatively large due to an irregularity of the pencil or felt-tip pen.

Therefore, it is possible to appropriately classify the plurality of specific color pixels into the conversion target pixels and the pixels not to be converted, based on whether the non-uniformity of the specific color pixel is the variance threshold TH1 or less.

When all the specific color pixels are processed as the attention pixel (step S200: YES), the CPU 410 specifies the background color of the scan image 10P, i.e., calculates the background color value (step S210). Specifically, the CPU 410 calculates, as the background color value, an average color value of all pixels in the scan image 10P. Instead of this configuration, the CPU 410 may calculate, as the background color value, an average color value of the plurality of background pixels specified in the scan image 10P in step S110.

When the background color is specified, the CPU 410 converts the color values of all the conversion target pixels determined in step S180 into the background color value. When the color values of the conversion target pixels are converted into the background color value, the unnecessary part removing processing is over. As a result, processed image data representing a processed image 31, in which the sub-objects 15, 16 have been removed from the scan image 10P by the unnecessary part removing processing, is generated.

Figure 11A:
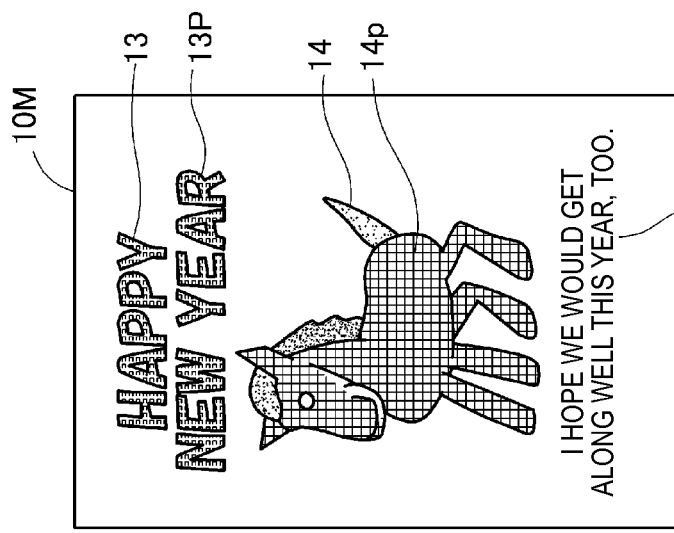
FIGS. 11A and 11B illustrate an example of a processed image.
Figure 11B:
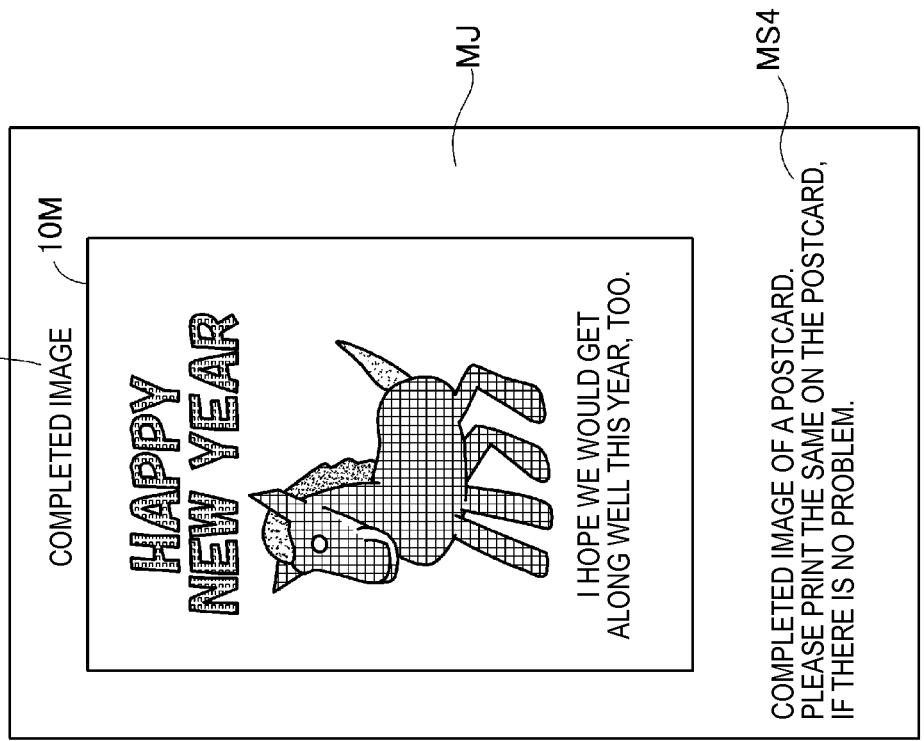

FIG. 11 illustrates an example of the processed image. The processed image 10M shown in FIG. 11A includes the main objects 13, 14 and the user objects 13P, 14P of the scan image 10P (FIG. 5) and does not include the sub-objects 15, 16 and the reference area 12. This is because the sub-objects 15, 16 and the reference area 12 have been removed by the above-described unnecessary part removing processing.

In step S50 of FIG. 3, the CPU 410 executes size adjusting processing of adjusting a size (i.e., the number of pixels in vertical and horizontal directions) of the processed image 10M to a desired size. In this illustrative embodiment, the size of the processed image 10M is adjusted to a postcard size.

In step S55, the CPU 410 generates test image data representing a test image 10T (FIG. 11B) by using the processed image data generated in step S50. The test image 10T includes the processed image 10M and a blank MJ. In the blank MJ, messages MS3, MS4 indicating that the test image 10T is an image for test printing of the processed image 10M are arranged.

Incidentally, the processed image data representing the processed image 10M is image data for printing the processed image 10M on the postcard. On the other hand, the test image data representing the test image 10T is data for printing the test image 10T on an A4 sheet larger than the postcard. A size of the processed image 10M printed on the postcard by using the processed image data is the same as a size of the processed image 10M in the test image 10T printed on the A4 sheet by using the test image data. For this reason, the user seeing the test image 10T printed on the A4 sheet can appropriately check a content of the processed image 10M when it is printed on the postcard, without printing the processed image 10M on the postcard.

In step S60, the CPU 410 transmits the generated processed image data and the test image data to the multi-function device 200 and ends the processing. When the processed image data and the test image data are received, the CPU 210 of the multi-function device 200 stores the corresponding data in the buffer area 221 and notifies the user that the processed image data and the test image data are received.

The processed image data and the test image data are provided to the user. The user enables the multi-function device 200 to print the test image 10T on the A4 sheet, for example. Then, the user checks the processed image 10M included in the test image 10T printed on the A4 sheet. When the user satisfies the content of the processed image 10M, the user enables the multi-function device 200 to print the processed image 10M on the postcard. When the user does not satisfy the content of the processed image 10M, the user may perform the generation of the processed image 10M one more time. For example, the user may change the template image or again color or write a letter on the template image 10 printed on the sheet and then enable the multi-function device 200 and the server 400 to execute the processing of FIG. 3 one more time.

According to the above illustrative embodiment, the user can generate an attractive processed image by coloring or writing a letter on the template image 10 printed on the sheet.

According to the above illustrative embodiment, the CPU 410 determines the plurality of specific color pixels, which have a color value within the specific color range CR, of the plurality of pixels in the scan image 10P (step S140 in FIG. 6). Then, the CPU 410 converts the color values of the pixels of which the variance value σn indicating the non-uniformity in the surrounding area SA is the variance threshold TH1 or less into the background color value (step S220). As a result, it is possible to appropriately determine a pixel of which color should be converted and to convert the color of the corresponding pixel. Specifically, the scan image 10P may include not only the specific color pixels configuring the sub-objects 15, 16 but also the specific pixels configuring the parts of the other objects 13, 14, 13P, 14P, 17P. However, as described above, as compared to the specific pixels configuring the sub-objects 15, 16, the specific color pixels in the other objects 13, 14, 13P, 14P, 17P are largely non-uniform. Therefore, considering the non-uniformity of the surrounding specific color pixels, the specific color pixels to be converted are determined. Thereby, it is possible to appropriately determine the specific color pixels configuring the sub-objects 15, 16 as the conversion target and to appropriately exclude the specific color pixels configuring the other objects from the conversion target. As a result, the CPU 410 can generate the appropriate processed image 31 in which the sub-objects 15, 16 in the scan image 10P have been appropriately removed and the other objects have not been removed. In other words, it is possible to appropriately determine a pixel of which color should be converted and to suppress a color of a pixel, which should not be converted, from being converted. As can be seen from the above descriptions, the specific color pixel is an example of the first-type pixel. Further, the pixel (i.e., the conversion target pixel), which has the variance value σn calculated in step S160 equal to or less than the variance threshold TH1, of the specific color pixels is an example of the second-type pixel.

Further, the conversion target pixel is determined using the variance value σn (i.e., the non-uniformity) of the color values of the specific color pixels having the color values within the surrounding area SA of the specific color pixel serving as the attention pixel. In this way, the non-uniformity of only the specific color pixels is used, so that it is possible to appropriately determine the pixels configuring the sub-objects 15, 16 having a single color on the scan image 10P.

The scan image 10P is generated via the printing in step S30 or the scanning (reading) in step S35. Therefore, as described above, the color of the sub-objects 15, 16 in the scan image 10P may be varied depending on the characteristics of the printing or reading. For this reason, it may be difficult to beforehand determine the appropriate specific color range CR and the variance threshold TH1. Here, it is thought that the color of the reference area 12 in the scan image 10P is varied to be the same as the color of the sub-objects 15, 16 in the scan image 10P via the printing or reading. For this reason, it is thought that the color of the reference area 12 on the scan image 10P is substantially the same as the specific color of the sub-objects 15, 16. In this illustrative embodiment, the interpretation result of interpreting the reference area 12 (FIG. 5) in the scan image 10P is used to determine the specific color pixel in the target image and the conversion target pixel of the plurality of specific color pixels. Therefore, it is possible to appropriately remove the sub-objects 15, 16 by appropriately specifying the sub-objects 15, 16 to be removed on the scan image 10P.

Specifically, the specific color range CR is determined on the basis of the color values of the plurality of pixels in the reference area 12 of the scan image 10P (step S130 in FIG. 6). As a result, it is possible to determine the appropriate specific color range CR, thereby determining the specific color pixel more appropriately. Further, it is possible to determine the conversion target pixel, which is determined from the specific color pixels, more appropriately.

Further, the variance threshold TH1 is determined on the basis of the brightness of the plurality of pixels in the reference area 12 of the scan image 10P (step S130 in FIG. 6). As a result, it is possible to determine the appropriate variance threshold TH1, thereby determining the appropriate conversion target pixel more appropriately.

Specifically, in this illustrative embodiment, since the target image data of the unnecessary part removing processing is the scan data, it is possible to appropriately remove the sub-objects 15, 16 in the scan image 10P of which color may be varied depending on the characteristics of the reading by using the interpretation result of the reference area 12.

Further, in this illustrative embodiment, the removal target of the scan image 10P is the sub-objects 15, 16 having a color different from the background, not the background of the scan image 10P. In the same method as the background removing processing that is generally executed, for example, a method of converting a color of a pixel having a color value within a specific range into a specific color, it is difficult to appropriately remove the sub-objects 15, 16 having a color different from the background, in many cases. However, in this illustrative embodiment, it is possible to appropriately remove the sub-objects 15, 16 having a color different from the background by using the specific color range CR, the variance value σn and the variance threshold TH1. As can be seen from the above descriptions, the areas of the sub-objects 15, 16 in the scan image 10P are examples of the specific area and the specific object area.

Modifications to Illustrative Embodiments (1) In the above-described illustrative embodiment, the template image 10 is printed on the sheet by using the template image data received from the server 400, so that the sheet ST having the template image 10 printed thereon is provided to the user. Instead of this configuration, the user may purchase the sheet ST having the template image 10 printed thereon.

(2) In the above-described illustrative embodiment, the color of the reference area 12 of the scan image 10P is substantially the same as the color of the sub-objects 15, 16 of the scan image 10P. However, the color of the reference area 12 and the color of the sub-objects 15, 16 may be different from each other and are preferably similar to each other so that the specific color range CR including the color of the plurality of pixels configuring the sub-objects 15, 16 can be appropriately determined by interpreting the reference area 12.

(3) In the above-described illustrative embodiment, the variance value σn is used as the value indicating the non-uniformity of the brightness of the specific color pixels. Instead of this configuration, a standard deviation, a brightness range in which the brightness of a predetermined ratio (for example, 80%) or more of pixels is included and the like may be used.

(4) In the above-described illustrative embodiment, the specific color of the sub-objects 15, 16, which are the removal target, is light gray. However, the present disclosure is not limited thereto. For example, a specific chromatic color (for example, red, blue, yellow and the like) may be used. Further, the reference area 12 of the template image 10 has preferably the same or similar color as or to the specific color of the sub-objects 15, 16, and the arrangement position thereof is not limited to the entire outer edge circumference. For example, the reference area 12 may be arranged at a part of the outer edge of the template image, for example, lower and upper end portions of an image, right and left end portions of an image, four corners of an image and the like.

(5) Incidentally, the reference area 12 of the template image 10 may be omitted (FIG. 2A). In this case, predetermined values are used as the specific color range CR and the variance threshold TH1. The specific color range CR and the variance threshold TH1 are predetermined by a programmer of the computer program 431 by interpreting the scan data, which is obtained by reading a patch having the same color as the sub-objects 15, 16 with a scanner, for example.

(6) In the above-described illustrative embodiment, the interpretation result of the reference area 12 in the scan image 10P is used to determine both the specific color range CR for determining the specific color pixel and the variance threshold TH1 for determining the conversion target pixel. Instead of this configuration, the interpretation result may be used to determine one of the specific color range CR and the variance threshold TH1. In this case, a predetermined value is preferably used as the value of the other of the specific color range CR and the variance threshold TH1, which is not determined using the interpretation result.

(7) In this illustrative embodiment, the surrounding area SA of the attention pixel NP is the rectangle area of height 7 pixels×width 7 pixels in which the attention pixel NP is located at the center thereof. However, the size of the surrounding area SA may be changed depending on the characteristics (for example, a reading resolution) of the scanner generating the scan image 10P, for example. Further, the shape of the surrounding area SA is not limited to the rectangle and may be a circle. In general, the surrounding area SA is preferably an area configured by a plurality of continuing pixels including the attention pixel NP.

(8) In the above-described illustrative embodiment, the image processing (for example, the processing of steps S45 to S55 in FIG. 3) that is executed by the CPU 410 of the server 400 may be executed by an apparatus different from the server 400, for example, the CPU 210 of the multi-function device 200. In this case, for example, the CPU 210 generates the processed image and then outputs the test image data or processed image data to the printer unit 240, thereby enabling the printer unit 240 to print the test image 10T or processed image 10M (FIG. 11). Further, the image processing may be executed by a CPU (not shown) of the PC 500 (FIG. 1) connected to a printing apparatus such as a printer. In this case, the CPU generates the processed image and then outputs the test image data or processed image data to an external printer, thereby enabling the external printer to print the test image 10T or processed image 10M (FIG. 11). That is, the output of the test image data or processed image data includes the transmission from the server 400 to the client apparatus (for example, the multi-function device 200) (the first illustrative embodiment), the supply from the CPU 210 in the multi-function device 200 to the printer unit 240, the transmission from the PC 500 to the external printer and the like.

(9) The image processing may be executed by a scanner driver that is installed in the PC 500 so as to control the scanner unit 250 of the multi-function device 200 or a stand-alone scanner (not shown). Further, the server 400 may be configured by one computing machine, like the illustrative embodiment, or may be configured by a computing system (for example, a distributed computing system for implementing a so-called cloud computing) including a plurality of computing machines.

(10) In the above-described illustrative embodiment, a part of the configuration implemented by the hardware may be replaced with software and a part of the configuration implemented by the software may be replaced with hardware.

What is claimed is:
1. An image processing apparatus comprising:
a processor; and
a memory storing instructions, the instructions, when executed by the processor, causing the image processing apparatus to perform:
receiving target image data representing a target image, which is a processing target of image processing, wherein the target image comprises a reference area arranged at a predetermined position in the target image, the reference area having the same or similar color as or to a specific area in the target image;
interpreting the reference area;
determining, from a plurality of pixels in the target image, a plurality of first-type pixels having a color value within a specific range, the specific range having a color value that indicates a color of a conversion target;
calculating, for each of the plurality of first-type pixels, non-uniformity of color values of a plurality of pixels in a specific surrounding area that includes the first-type pixels;
determining, from the plurality of first-type pixels, a second-type pixel of which non-uniformity is a reference value or less, wherein at least one of the first-type pixel and the second-type pixel is determined using an interpretation result of the reference area; and
converting a color value of the second-type pixel into a specific color value.

2. The image processing apparatus according to claim 1, wherein the calculating the non-uniformity comprises calculating non-uniformity of color values of the plurality of first-type pixels in the specific surrounding area.

3. The image processing apparatus according to claim 1, wherein the interpreting the reference area comprises determining, based on color values of a plurality of pixels in the reference area, the specific range for determining the first-type pixel.

4. The image processing apparatus according to claim 1, wherein the interpreting the reference area comprises determining, based on color values of a plurality of pixels in the reference area, the reference value for determining the second-type pixel.

5. The image processing apparatus according to claim 4, wherein the reference value is a variance threshold determined based on a variance value of brightness of the plurality of pixels in the reference area, and
wherein the determining the second-type pixel comprises determining, from the plurality of first-type pixels, a pixel, of which a non-uniformity of a brightness is the variance threshold or less, as the second-type pixel.

6. The image processing apparatus according to claim 1, wherein the target image data is image data that is obtained by optically reading a document comprising an image representing the reference area and the specific area.

7. The image processing apparatus according to claim 1, wherein the specific area in the target image is a specific object area representing an object different from a background of the target image.

8. The image processing apparatus according to claim 1, wherein converting the color value of the second-type pixel into the specific color value includes generating a converted target image,
wherein the instructions, when executed by the processor, cause the image processing apparatus to further perform outputting first image data representing the converted target image and second image data representing an image comprising the converted target image and a blank, and
wherein a size of the converted target image printed on a first-type sheet by using the first image data is the same as a size of the converted target image printed on a second-type sheet, which is larger than the first-type sheet, by using the second image data.

9. The image processing apparatus according to claim 1, wherein the instructions, when executed by the processor, cause the image processing apparatus to further perform determining, from the plurality of first-type pixels, a third-type pixel of which the non-uniformity is more than the reference value, and
wherein the image processing apparatus is configured not to covert the third-type pixel into the specific color value.

10. The image processing apparatus according to claim 1, wherein the instructions, when executed by the processor, cause the image processing apparatus to further perform controlling a print execution unit to print a template image represented by template image data, and
wherein the receiving receives the target image data by optically reading a document on which a user draws the printed template image.

11. A non-transitory computer-readable medium having a computer program stored thereon and readable by a computer, the computer program, when executed by the computer, causes the computer to perform operations comprising:
receiving target image data representing a target image, which is a processing target of image processing, wherein the target image comprises a reference area arranged at a predetermined position in the target image, the reference area having the same or similar color as or to a specific area in the target image;
interpreting the reference area;
determining, from a plurality of pixels in the target image, a plurality of first-type pixels having a color value within a specific range comprising a color value indicating a color of a conversion target;
calculating, for each of the plurality of first-type pixels, non-uniformity of color values of a plurality of pixels in a specific surrounding area comprising the first-type pixels;
determining, from the plurality of first-type pixels, a second-type pixel of which the non-uniformity is a reference value or less, wherein at least one of the first-type pixel and the second-type pixel is determined using an interpretation result of the reference area; and
converting a color value of the second-type pixel into a specific color value.

12. The non-transitory computer-readable medium according to claim 11, wherein the calculating the non-uniformity comprises calculating non-uniformity of color values of the plurality of first-type pixels in the specific surrounding area.

13. The non-transitory computer-readable medium according to claim 11, wherein the interpreting the reference area comprises determining, based on color values of a plurality of pixels in the reference area, the specific range for determining the first-type pixel.

14. The non-transitory computer-readable medium according to claim 11, wherein the interpreting the reference area comprises determining, based on color values of a plurality of pixels in the reference area, the reference value for determining the second-type pixel.

15. The non-transitory computer-readable medium according to claim 14, wherein the reference value is a variance threshold determined based on a variance value of brightness of the plurality of pixels in the reference area, and
wherein the determining the second-type pixel comprises determining, from the plurality of first-type pixels, a pixel, of which a non-uniformity of a brightness is the variance threshold or less, as the second-type pixel.

16. The non-transitory computer-readable medium according to claim 11,
wherein the target image data is image data that is obtained by optically reading a document comprising an image representing the reference area and the specific area.

17. The non-transitory computer-readable medium according to claim 11,
wherein the specific area in the target image is a specific object area representing an object different from a background of the target image.

18. The non-transitory computer-readable medium according to claim 11,
wherein converting the color value of the second-type pixel into the specific color value includes generating a converted target image,
wherein the operations further comprise outputting first image data representing the converted target image and second image data representing an image comprising the converted target image and a blank, and
wherein a size of the converted target image printed on a first-type sheet by using the first image data is the same as a size of the converted target image printed on a second-type sheet, which is larger than the first-type sheet, by using the second image data.

* * * * *